(12) United States Patent
Kim et al.

(10) Patent No.: US 12,080,852 B2
(45) Date of Patent: Sep. 3, 2024

(54) SECONDARY BATTERY

(71) Applicant: SAMSUNG SDI CO., LTD., Yongin-si (KR)

(72) Inventors: Kyoung Hwan Kim, Yongin-si (KR); Cheoul Whan Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 606 days.

(21) Appl. No.: 16/967,519

(22) PCT Filed: Nov. 14, 2019

(86) PCT No.: PCT/KR2019/015565
§ 371 (c)(1),
(2) Date: Aug. 5, 2020

(87) PCT Pub. No.: WO2020/105959
PCT Pub. Date: May 28, 2020

(65) Prior Publication Data
US 2021/0234202 A1 Jul. 29, 2021

(30) Foreign Application Priority Data
Nov. 19, 2018 (KR) .................. 10-2018-0142844

(51) Int. Cl.
*H01M 10/0583* (2010.01)
*H01M 10/052* (2010.01)

(52) U.S. Cl.
CPC ..... *H01M 10/0583* (2013.01); *H01M 10/052* (2013.01)

(58) Field of Classification Search
CPC ....... H01M 10/0583; H01M 2004/021; H01M 10/052
See application file for complete search history.

(56) References Cited

U.S. PATENT DOCUMENTS 8,440,356 B2   5/2013   Kim et al.
8,460,828 B2   6/2013   Kim et al.
(Continued)

FOREIGN PATENT DOCUMENTS

CN   104011929 A   8/2014
CN   104170151 A   11/2014
(Continued)

OTHER PUBLICATIONS

International Search Report dated Feb. 25, 2020 for PCT/KR2019/015565.
(Continued)

*Primary Examiner* — Matthew T Martin
*Assistant Examiner* — Krishna R Hammond
(74) *Attorney, Agent, or Firm* — Lee IP Law, P.C.

(57) ABSTRACT

The present invention relates to a secondary battery capable of enhancing safety and test reliability. According to one embodiment, disclosed is a secondary battery comprising: an electrode assembly in which a first electrode plate and a second electrode plate are alternately stacked; and a case for accommodating the electrode assembly, wherein the first electrode plate includes an outer electrode plate located at the outermost part of the electrode assembly, and an inner electrode plate located inside the electrode assembly, and the outer electrode plate is smaller than the inner electrode plate and the second electrode plate.

10 Claims, 3 Drawing Sheets

(56) References Cited

U.S. PATENT DOCUMENTS

| | | |
|---|---|---|
| 9,252,452 B2 * | 2/2016 | Kwon ................ H01M 10/0585 |
| 10,056,577 B2 * | 8/2018 | Jang .................... H01M 50/116 |
| 10,305,146 B2 * | 5/2019 | Yoshima ............. H01M 50/209 |
| 10,319,954 B2 | 6/2019 | Kong |
| 2002/0122975 A1 | 9/2002 | Spillman et al. |
| 2010/0015529 A1 * | 1/2010 | Kim ................... H01M 10/0413 429/246 |
| 2011/0316485 A1 * | 12/2011 | Krishnan |
| 2012/0094168 A1 | 4/2012 | Kim et al. |
| 2013/0295436 A1 | 11/2013 | Kwon et al. |
| 2014/0050958 A1 | 2/2014 | Kwon et al. |
| 2014/0205879 A1 | 7/2014 | Jang et al. |
| 2014/0255755 A1 * | 9/2014 | Kwon ................ H01M 50/105 429/149 |
| 2014/0315074 A1 | 10/2014 | Kong |
| 2014/0349192 A1 | 11/2014 | Park et al. |
| 2015/0180082 A1 | 6/2015 | Jung et al. |
| 2017/0033407 A1 | 2/2017 | Kim et al. |
| 2017/0141433 A1 | 5/2017 | Yoshima et al. |
| 2017/0288182 A1 | 10/2017 | Park et al. |
| 2018/0026254 A1 | 1/2018 | Oh et al. |

FOREIGN PATENT DOCUMENTS

| | | |
|---|---|---|
| CN | 104247123 A | 12/2014 |
| JP | 2004-111219 A | 4/2004 |
| KR | 10-2007-0110563 A | 11/2007 |
| KR | 10-2010-0042429 A | 4/2010 |
| KR | 10-2013-0106755 A | 9/2013 |
| KR | 2013-0118718 A | 10/2013 |
| KR | 10-2014-0022447 A | 2/2014 |
| KR | 10-2014-0125065 A | 10/2014 |
| KR | 20150046533 A * | 4/2015 |
| KR | 10-1616426 B1 | 4/2016 |
| KR | 10-2017-0022589 A | 3/2017 |
| KR | 10-2017-0032456 A | 3/2017 |
| KR | 20180080910 A * | 7/2018 |
| WO | WO 2014-077469 A1 | 5/2014 |

OTHER PUBLICATIONS

European Search Report dated Sep. 16, 2022.
Chinese Office action and Search Report dated Jan. 5, 2023.
Zhang, Journal of Functional Materials, 2008(01) pp. 170-172+176, Carbon Nanotubes Containing conductive, etc . . . .
Chinese Notice of Allowance dated Jun. 20, 2023.

* cited by examiner

SECONDARY BATTERY

CROSS REFERENCE TO RELATED APPLICATIONS

This is the U.S. national phase application based on PCT Application No. PCT/KR2019/015565, filed Nov. 14, 2019, which is based on Korean Patent Application No. 10-2018-0142844, filed Nov. 19, 2018, the entire contents of all of which are hereby incorporated by reference.

TECHNICAL FIELD

The present invention relates to a secondary battery.

BACKGROUND ART

A secondary battery can be charged and discharged, unlike a primary battery that cannot be charged. Low-capacity secondary batteries packaged in the form of a pack including a single battery cell are used as the power source for various portable small-sized electronic devices, such as, for example, mobile phones or camcorders, and high-capacity secondary batteries having several tens to several hundreds of battery cells connected to one another are used as the power source for motor drives, such as those in hybrid vehicles.

Such a secondary battery includes an electrode assembly including a positive electrode and a negative electrode, a case accommodating the electrode assembly, and electrode terminals connected to the electrode assembly. The case is classified into a cylindrical type, a prismatic type or a pouch type according to its external shape. Among others, pouch type secondary batteries may be easily modified in various shapes and may be formed of a lightweight laminate exterior material.

The above information disclosed in this Background section is only for enhancement of understanding of the background of the described technology and therefore it may contain information that does not form the prior art that is already known in this country to a person of ordinary skill in the art.

DESCRIPTION OF EMBODIMENTS

Technical Problem

The present invention provides a secondary battery capable of enhancing safety and test reliability.

Solution to Problem

According to an aspect of the present invention, provided is a secondary battery including: an electrode assembly in which a first electrode plate and a second electrode plate are alternately stacked; and a case for accommodating the electrode assembly, wherein the first electrode plate includes an outer electrode plate located at the outermost part of the electrode assembly, and an inner electrode plate located inside the electrode assembly, and the outer electrode plate is smaller than the inner electrode plate and the second electrode plate.

A difference between a lateral length of the outer electrode plate and a lateral length of the inner electrode plate may range from 0.5 mm to 2 mm.

A difference between a longitudinal length of the outer electrode plate and a longitudinal length of the inner electrode plate may range from 0.5 mm to 2 mm.

A plurality of inner electrode plates may be of the same size, and a plurality of second electrode plates may also be of the same size.

The outer electrode plate may include a first active material layer formed on only one surface thereof facing the second electrode plate.

At least one end of the outer electrode plate may be located at the same position as or further inward than one end of the inner electrode plate.

The secondary battery may further include a separator interposed between the first electrode plate and the second electrode plate, the separator extending in a perpendicular direction to a direction in which current collector tabs formed at the first electrode plate and the second electrode plate protrude, and being bent in a Z-shaped configuration.

According to another aspect of the present invention, provided is a secondary battery including: an electrode assembly in which a first electrode plate and a second electrode plate are alternately stacked; and a case for accommodating the electrode assembly, wherein the first electrode plate includes an outer electrode plate located at the outermost part of the electrode assembly, and an inner electrode plate located inside the electrode assembly, and at least one end of the outer electrode plate is located at the same position as or further inward than one end of the inner electrode plate.

A difference between a lateral length of the outer electrode plate and a lateral length of the inner electrode plate may range from 0.5 mm to 2 mm.

A difference between a longitudinal length of the outer electrode plate and a longitudinal length of the inner electrode plate may range from 0.5 mm to 2 mm.

A plurality of inner electrode plates may be of the same size, and a plurality of second electrode plates may also be of the same size.

The outer electrode plate may include a first active material layer formed on only one surface thereof facing the second electrode plate.

Advantageous Effects of Disclosure

As described above, the secondary battery according to an embodiment is capable of enhancing safety and test reliability by preventing deformation of the outer electrode plate during thermal compression such that the outer electrode plate located at the outermost part of the electrode assembly is formed to be smaller than the inner electrode plate

MODE OF DISCLOSURE

Hereinafter, example embodiments of the present invention will be described in detail.

Various embodiments of the present invention may be embodied in many different forms and should not be construed as being limited to the example embodiments set forth herein. Rather, these example embodiments of the invention are provided so that this invention will be thorough and complete and will convey inventive concepts of the invention to those skilled in the art. In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1:
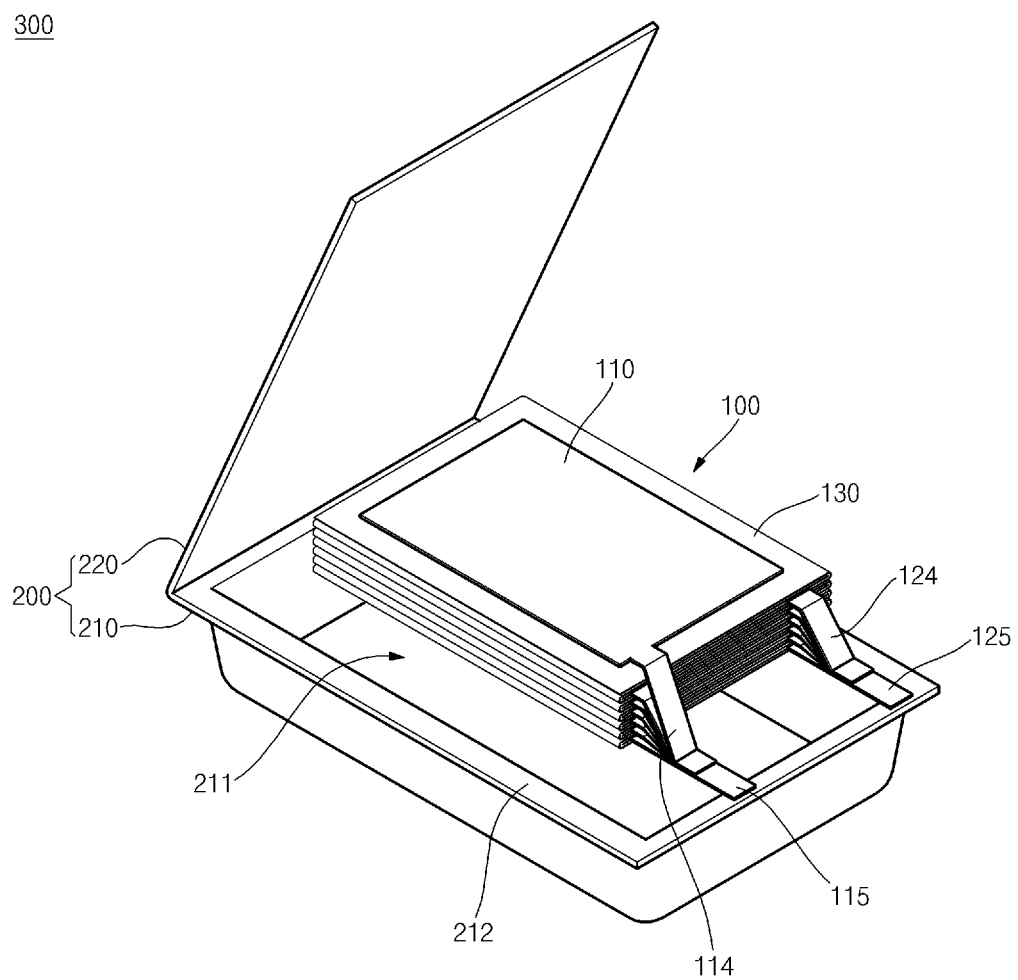
FIG. 1 is a perspective view of a secondary battery according to an embodiment.
Figure 2:
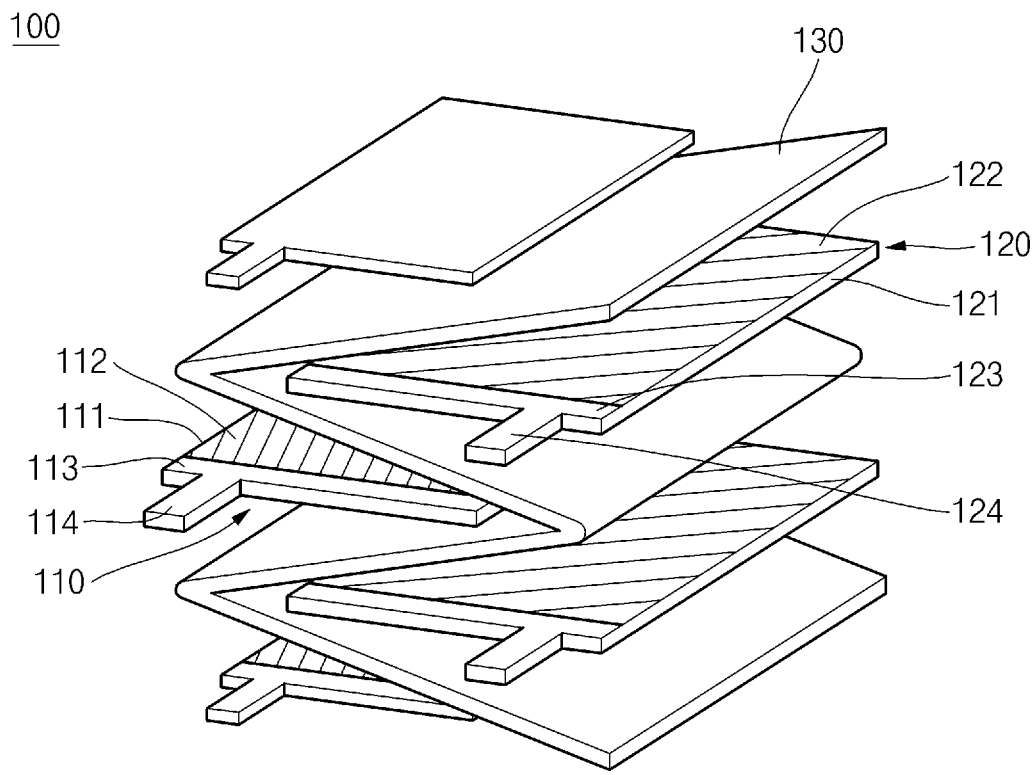
FIG. 2 is a perspective view of an electrode assembly according to an embodiment.

FIG. 1 is a perspective view of a secondary battery according to an embodiment. FIG. 2 is a perspective view of an electrode assembly according to an embodiment.

Referring to FIGS. 1 and 2, the secondary battery 300 according to an embodiment includes an electrode assembly 100 and a case 200.

The electrode assembly 100 includes a first electrode plate 110, a second electrode plate 120, and a separator 130 interposed between the first electrode plate 110 and the second electrode plate 120. The electrode assembly 100 may be formed by stacking a plurality of first electrode plates 110 and a plurality of second electrode plates 120. In addition, as shown in FIG. 2, the separator 130 may be shaped of a plate and may be bent in a Z-shaped configuration so as to be interposed between the first electrode plate 110 and the second electrode plate 120 to then be stacked. Of course, the separator 130 may also include a plurality of separators each disposed between the first electrode plate 110 and the second electrode plate 120, like the plurality of first electrode plates 110 and the plurality of second electrode plates 120. In addition, in order to prevent a short circuit between the first electrode plate 110 and the second electrode plate 120, the separator 130 may be formed to be larger than the first electrode plate 110 and the second electrode plate 120. Additionally, the plurality of first electrode plates 110 may be arranged to be located at the outermost part of the electrode assembly 100, that is, at the topmost or bottommost parts of the stacked electrode assembly 100.

Each of the first electrode plates 110 includes a first electrode current collector 111 formed of a metal foil such as an aluminum foil, a first active material layer 112 located on opposite surfaces of the first electrode current collector 111 and having a first active material coated thereon, and a first uncoated portion 113 not having the first active material coated thereon. The first active material may be a lithium-containing transition metal oxide represented by a metal oxide such as $LiCoO_2$, $LiNiO_2$, $LiMnO_2$, $LiMn_2O_4$, or $LiNi_{1-x-y}Co_xM_yO_2$, where $0 \leq x \leq 1$, $0 \leq y \leq 1$, $0 \leq x+y \leq 1$, and M is a metal such as Al, Sr, Mg, or La, or a lithium chalcogenide compound. For example, the first electrode plate 110 may be a positive electrode plate. In addition, the first electrode plate 110 may include a first current collector tab 114 formed on the first uncoated portion 113. Here, the first current collector tab 114 is formed by being previously cut so as to upwardly protrude when the first electrode plate 110 is formed, and thus is integrally formed with the first electrode current collector 111. That is, the first current collector tab 114 may be regarded as the first uncoated portion 113. The plurality of first electrode plates 110 are stacked such that the first current collector tabs 114 are superposed at the same position. In addition, the plurality of first current collector tabs 114 may be welded to one another, and a first electrode lead 115 may be attached to the welded first current collector tabs 114. The first electrode lead 115 may protrude to the exterior side of the case 200, which will later be described.

Each of the second electrode plates 120 includes a second electrode current collector 121 formed of a metal foil such as a copper or nickel foil, a second active material layer 122 located on opposite surfaces of the second electrode current collector 121 and having a second active material coated thereon, and a second uncoated portion 123 not having the second active material coated thereon. The second active material may be a carbonaceous material, such as crystalline carbon, amorphous carbon, a carbon composite, or carbon fiber, a lithium metal or a lithium alloy. For example, the second electrode plate 120 may be a negative electrode material. In addition, the second electrode plate 120 may include a second current collector tab 124 formed on the second uncoated portion 123. Here, the second current collector tab 124 is formed by being previously cut so as to upwardly protrude when the second electrode plate 120 is formed, and thus is integrally formed with the second electrode current collector 121. That is, the second current collector tab 124 may be regarded as the second uncoated portion 123. The plurality of second electrode plates 120 are stacked such that the second current collector tabs 124 are superposed at the same position. In addition, the plurality of second current collector tabs 124 may be welded to one another, and a second electrode lead 125 may be attached to the welded second current collector tabs 124. The second electrode lead 125 may protrude to the exterior side of the case 200, which will later be described.

The separator 130, disposed between the first electrode plate 110 and the second electrode plate 120, prevents a short circuit therebetween and allows lithium ions to move. The separator 130 may include polyethylene, polypropylene, or a composite film of polyethylene and polypropylene.

The separator 130 may extend in a perpendicular direction to a direction in which first current collector tab 114 and the second current collector tab 124 protrude, and may be bent in a Z-shaped configuration to be interposed between the first electrode plate 110 and the second electrode plate 120.

The case 200 includes a lower case part 210 in which the electrode assembly 100 is accommodated, and an upper case part 220 coupled to the lower case 210. The case 120 may be divided into the upper case part 220 and the lower case part 210 by bending a middle portion of an integrated rectangular pouch film. In addition, the lower case part 210 includes an accommodation groove 211 formed by a pressing process to accommodate the electrode assembly 100, and a sealing part 212 to be sealed with the upper case part 220. The sealing part 212 may be located at one side along which the upper case part 220 and the lower case part 210 are integrated to contact each other, and at the other three sides. The case 200 includes two long sides where the upper case part 220 and the lower case part 210 face each other, and two short sides disposed perpendicular to the two long sides and facing each other. Here, the first electrode lead 115 and the second electrode lead 125 of the electrode assembly 100 are drawn out through one of the two short side, the one facing the other short side where the upper case part 220 and the lower case part 210 are coupled to each other. Here, an insulation member (not shown) may be attached to each of the first electrode lead 115 and the second electrode lead 125 to prevent a short circuit between each of the first and second electrode leads 115 and 125 and the case 200.

In addition, the electrode assembly 100 and an electrolyte are accommodated in the case 200 to then be subjected to a heat-press process, thereby completing the secondary battery 300. As the result of the heat-press process, an adhesion force is created between the first electrode plate 110 and the separator 130 and between the second electrode plate 120 and the separator 130. For example, the adhesion force created between the first electrode plate 110 and the separator 130 may range from 200 mN/25 mm to 500 mN/25 mm, and the adhesion force created between the second electrode plate 120 and the separator 130 may range from 130 mN/25 mm to 300 mN/25 mm. Here, the adhesion force created between the first electrode plate 110 or the second electrode plate 120 and the separator 130 may be measured using a suitable method known in the art. Examples of the method for measuring the adhesion force may include, but not limited to, the following method according to Article 8 of the Korean Industrial Standard KS-A-01107 (a test method of an adhesive tape and sheet). A separator is cut to have a width of 25 mm and a length of 250 mm, and a tape (Nitto) is adhered to one surface of the separator to obtain a specimen. The first electrode plate or the second electrode plate is compressed on the other surface of the separator by reciprocating once a compression roller having a load of 2 kg at a speed of 300 mm/min. 30 minutes later after the compression, the specimen is 180° overturned and about 25 mm peeled off, and the separator and the tape on one surface of the separator are fixed into an upper clip of a tensile strength tester, and the first electrode plate or the second electrode plate compressed on the other surface of the separator is fixed into a lower clip and pulled at a speed of 60 mm/min to measure a pressure when the first electrode plate or the second electrode plate is peeled off from the separator.

Figure 3:
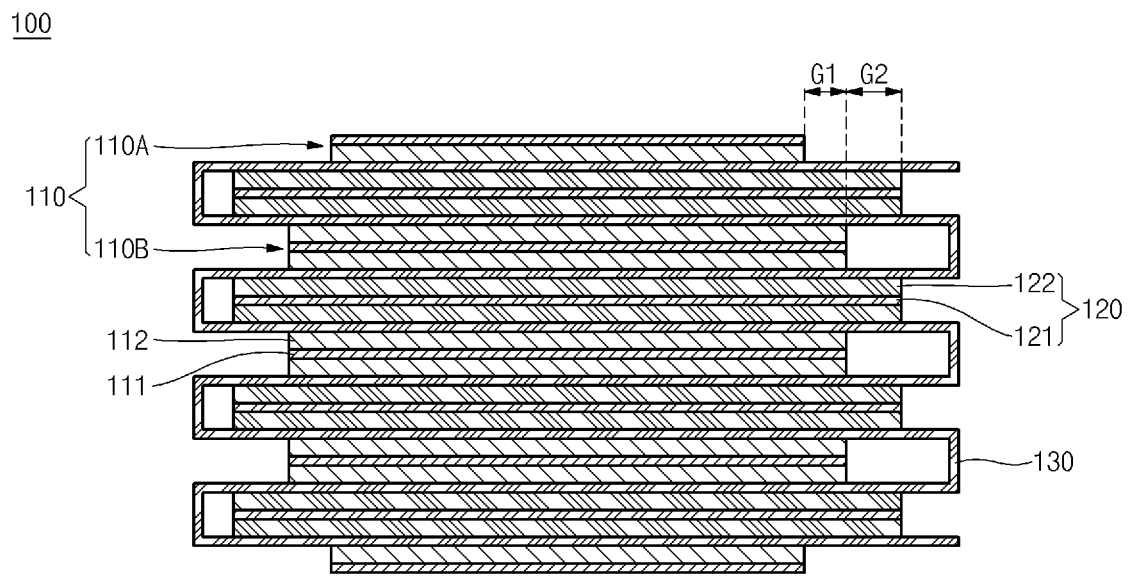
FIG. 3 is a cross-sectional view of the electrode assembly according to an embodiment.
Figure 4:
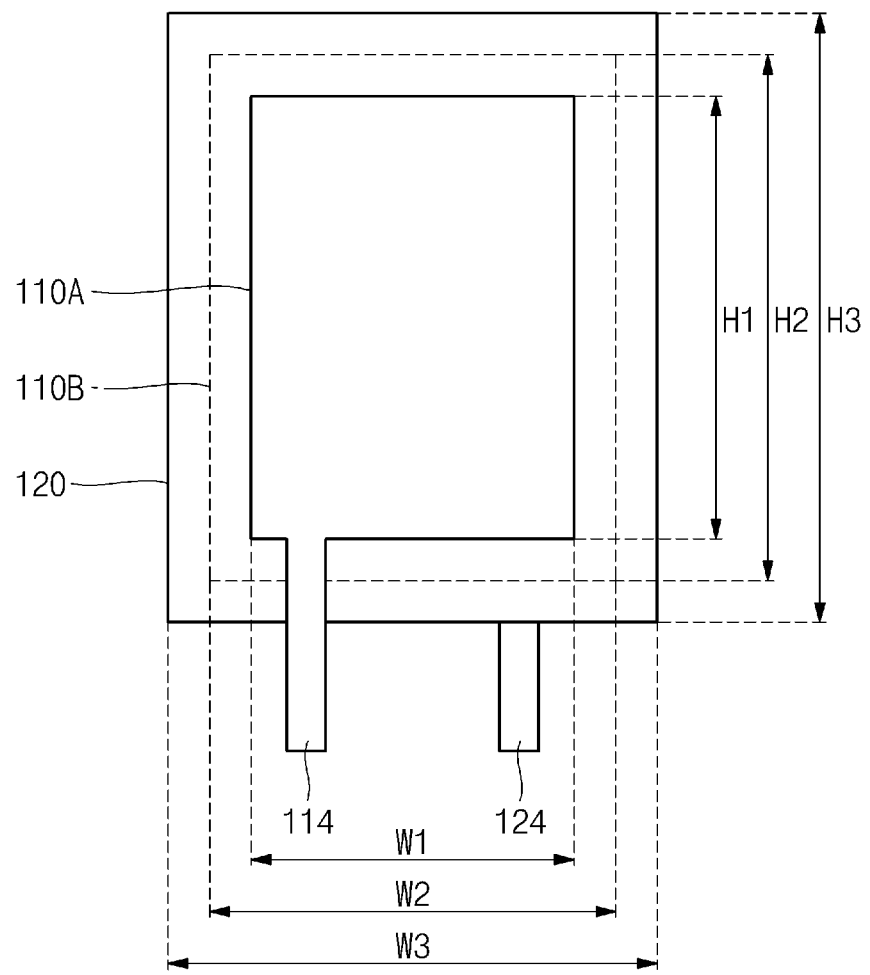
FIG. 4 is a plan view of the electrode assembly according to an embodiment.

FIG. 3 is a cross-sectional view of the electrode assembly according to an embodiment. FIG. 4 is a plan view of the electrode assembly according to an embodiment.

Referring to FIGS. 3 and 4, the first electrode plate 110 includes an outer electrode plate 110A located at the outermost part of the electrode assembly 100, and the inner electrode plate 110B located inside the electrode assembly 100. The outer electrode plate 110A is formed to be smaller than the inner electrode plate 110B. Here, the outer electrode plate 110A located at the outermost part of the electrode assembly 100a may include a first active material layer 112 formed on only one surface of the first electrode current collector 111. That is, the first active material layer 112 makes contact with the separator 130 on the outer electrode plate 110A and is formed on a surface of the outer electrode plate facing the second electrode plate 120. Additionally, a plurality of inner electrode plates 110B located further inward than the outer electrode plate 110A are formed to have the same size. In addition, the second electrode plate 120 may be formed to be larger than the outer electrode plate 110A and may be formed to be of the same size as or be larger than the inner electrode plate 110B in size. In other words, the outer electrode plate 110A may be smaller than the inner electrode plate 110B and the second electrode plate 120. In addition, a plurality of second electrode plates 120 located further inward than the outer electrode plate 110A are also formed to have the same size.

As described above, if the outer electrode plate 110A located at the outermost part of the electrode assembly 100 is formed to be smaller than the inner electrode plate 110B and the second electrode plate 120, the outer electrode plate 110A located at the outermost part may be prevented from being bent or deformed when the heat-press process is performed after inserting the electrode assembly 100 into the case 200. That is, the inner electrode plate 110B and the second electrode plate 120, which are smaller than the outer electrode plate 110A and located further inward than the outer electrode plate 110A, may function as supports, thereby preventing the outer electrode plate 110A located at the outermost part of the electrode assembly 100 from being bent or deformed during the heat-press process. Additionally, since the plurality of inner electrode plates 110B and the plurality of second electrode plates 120 located further inward than the outer electrode plate 110A are each of the same size, the outer electrode plate 110A may be more securely supported during the heat-press process. For example, if an outer electrode plate located at the outermost part is formed to be larger than inwardly located inner electrode plates, the outer electrode plate protruding to the exterior side of the inner electrode plates may be bent to the interior side of an electrode assembly due to a force applied during a heat-press process. Accordingly, there is a potential risk of a short circuit between the outer electrode plate and the second electrode plate, and an error may be detected in the X-ray test performed after the heat-press process. In the present invention, however, since the outer electrode plate 110A plate located at the outermost part is smaller than the inner electrode plate 110B, X-ray test reliability may be enhanced by preventing deformation of the outer electrode plate 110A Specifically, as shown in FIG. 4, a lateral length (W1) of the outer electrode plate 110A is smaller than a lateral length (W2) of the inner electrode plate 110B (W1<W2), and the lateral length (W2) of the inner electrode plate 110B is smaller than a lateral length (W3) of the second electrode plate 120 (W2<W3). In addition, a longitudinal length (H1) of the outer electrode plate 110A is smaller than a longitudinal length (H2) of the inner electrode plate 110B (H1<H2), and the longitudinal length (H2) of the inner electrode plate 110B is smaller than a longitudinal length (H3) of the second electrode plate 120 (H2<H3). Accordingly, an area of the outer electrode plate 110A is smaller than that of the inner electrode plate 110B, and the area of the inner electrode plate 110B is smaller than that of the second electrode plate 120.

In another embodiment, the lateral length (W2) of the inner electrode plate 110B may be equal to the lateral length (W3) of the second electrode plate 120 (W2=W3), and the longitudinal length (H2) of the inner electrode plate 110B may be equal to the longitudinal length (H3) of the second electrode plate 120 (H2=H3), so that the inner electrode plate 110B and the second electrode plate 120 may be formed to have the same area. Even in this case, the outer electrode plate 110A is formed to be smaller than the inner electrode plate 110B and the second electrode plate 120.

A difference between the lateral length (W1) of the outer electrode plate 110A and the lateral length (W2) of the inner electrode plate 110B may range from 0.5 mm to 2 mm. Here, if the difference between the lateral length (W1) of the outer electrode plate 110A and the lateral length (W2) of the inner electrode plate 110B is less than 0.5 mm, an alignment process margin may be small, so that the outer electrode plate 110A may protrude more than the inner electrode plate 110B at some portions. In addition, if the difference between the lateral length (W1) of the outer electrode plate 110A and the lateral length (W2) of the inner electrode plate 110B is greater than 2 mm, the outer electrode plate 110A may be inordinately reduced in size, resulting in a reduction of capacity of the electrode assembly 100.

A difference between the longitudinal length (H1) of the outer electrode plate 110A and the longitudinal length (H2) of the inner electrode plate 110B may range from 0.5 mm to 2 mm. Here, if the difference between the longitudinal length (H1) of the outer electrode plate 110A and the longitudinal length (H2) of the inner electrode plate 110B is less than 0.5 mm, an alignment process margin may be small, so that the outer electrode plate 110A may protrude more than the inner electrode plate 110B at some portions. In addition, if the difference between the longitudinal length (H1) of the outer electrode plate 110A and the longitudinal length (H2) of the inner electrode plate 110B is greater than 2 mm, the outer electrode plate 110A may be inordinately reduced in size, resulting in a reduction of capacity of the electrode assembly 100.

In addition, if the outer electrode plate 110A is formed to be smaller than the inner electrode plate 110B, at least one end of the outer electrode plate 110A may not protrude from the inner electrode plate 110B even if the outer electrode plate 110A is pushed in stacking electrode plates. In other words, even if the outer electrode plate 110A is biased toward one side due to an alignment error during the stacking of electrode plates, one end of the pushed part of the outer electrode plate 110A may be located at the same position as or further inward than one end of the inner electrode plate 110B.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
an electrode assembly including a plurality of first electrode plates and a plurality of second electrode plates, alternately stacked; and
a case for accommodating the electrode assembly,
wherein:
the plurality of first electrode plates have a polarity different from a polarity of the plurality of second electrode plates,
the plurality of first electrode plates includes at least one outer first electrode plate located at an outermost part of the electrode assembly, and a plurality of inner first electrode plates located inside the electrode assembly, and the at least one outer first electrode plate is smaller than each inner first electrode plate of the plurality of inner first electrode plates and smaller than each second electrode plate of the plurality of second electrode plates,
the plurality of inner first electrode plates are of the same size,
the plurality of second electrode plates are of the same size, and
each inner first electrode plate of the plurality of inner first electrode plates is smaller than each second electrode plate of the plurality of second electrode plates.

2. The secondary battery of claim 1, wherein a difference between a lateral length of the at least one outer first electrode plate and a lateral length of each inner first electrode plate of the plurality of inner first electrode plates ranges from 0.5 mm to 2 mm.

3. The secondary battery of claim 1, wherein a difference between a longitudinal length of the at least one outer first electrode plate and a longitudinal length of each inner first electrode plate of the plurality of inner first electrode plates ranges from 0.5 mm to 2 mm.

4. The secondary battery of claim 1, wherein the at least one outer first electrode plate includes a first active material layer formed on only one surface thereof facing the plurality of second electrode plates.

5. The secondary battery of claim 1, wherein at least one end of the at least one outer first electrode plate is further inward than one end of each inner first electrode plate of the plurality of inner first electrode plates.

6. The secondary battery of claim 1, further comprising a separator interposed between the plurality of first electrode plates and the plurality of second electrode plates, wherein the separator extends in a perpendicular direction to a direction in which current collector tabs formed at the plurality of first electrode plates and the plurality of second electrode plates protrude, and is bent in a Z-shaped configuration.

7. A secondary battery comprising:
an electrode assembly including a plurality of first electrode plates and a plurality of second electrode plates, alternately stacked; and
a case for accommodating the electrode assembly,
wherein:
the plurality of first electrode plates have a polarity different from a polarity of the plurality of second electrode plates,
the plurality of first electrode plates includes at least one outer first electrode plate located at an outermost part of the electrode assembly, and a plurality of inner first electrode plates located inside the electrode assembly, and at least one end of the at least one outer first electrode plate is located further inward than one end of each inner first electrode plate of the plurality of inner first electrode plates, the plurality of inner first electrode plates are of the same size, the plurality of second electrode plates are of the same size, and each inner first electrode plate of the plurality of inner first electrode plates is smaller than each second electrode plate of the plurality of second electrode plates.

8. The secondary battery of claim 7, wherein a difference between a lateral length of the at least one outer first electrode plate and a lateral length of each inner first electrode plate of the plurality of inner first electrode plates ranges from 0.5 mm to 2 mm.

9. The secondary battery of claim 7, wherein a difference between a longitudinal length of the at least one outer first electrode plate and a longitudinal length of each inner first electrode plate of the plurality of inner first electrode plates ranges from 0.5 mm to 2 mm.

10. The secondary battery of claim 7, wherein the at least one outer first electrode plate includes a first active material layer formed on only one surface thereof facing the plurality of second electrode plates.

\* \* \* \* \*